United States Patent
Liu et al.

(10) Patent No.: US 8,359,466 B2
(45) Date of Patent: Jan. 22, 2013

(54) SECURITY ASSOCIATION PREFETCH FOR SECURITY PROTCOL PROCESSING

(75) Inventors: Sheng Liu, Cupertino, CA (US); Nikola Radovanovic, Los Altos, CA (US); Ephrem Wu, San Mateo, CA (US)

(73) Assignee: LSI Corporation, Milpitas, CA (US)

( * ) Notice: Subject to any disclaimer, the term of this patent is extended or adjusted under 35 U.S.C. 154(b) by 89 days.

(21) Appl. No.: 13/097,213

(22) Filed: Apr. 29, 2011

(65) Prior Publication Data
US 2012/0278615 A1 Nov. 1, 2012

(51) Int. Cl.
*H04L 29/06* (2006.01)
*G06F 9/00* (2006.01)

(52) U.S. Cl. .......................................... 713/160; 726/14
(58) Field of Classification Search .................. 713/160; 726/14
See application file for complete search history.

(56) References Cited

U.S. PATENT DOCUMENTS

| | | | |
|---|---|---|---|
| 7,502,474 B2 | 3/2009 | Kaniz et al. | |
| 7,783,037 B1 * | 8/2010 | Bong | 380/37 |
| 2004/0117653 A1 * | 6/2004 | Shapira et al. | 713/201 |
| 2010/0205428 A1 * | 8/2010 | Weis et al. | 713/153 |

OTHER PUBLICATIONS

Internet Engineering Task Force (IETF) Requests for Comment (RFC) 2408, "Internet Security Association and Key Management Protocol", IETF (1998).

* cited by examiner

*Primary Examiner* — Techane Gergiso

(57) ABSTRACT

Described embodiments provide a network processor that includes a security protocol processor for staged security processing of a packet having a security association (SA). An SA request module computes an address for the SA. The SA is fetched to a local memory. An SA prefetch control word (SPCW) is read from the SA in the local memory. The SPCW identifies one or more regions of the SA and the associated stages for the one or more regions. An SPCW parser generates one or more stage SPCWs (SSPCWs) from the SPCW. Each of the SSPCWs is stored in a corresponding SSPCW register. A prefetch module services each SSPCW register in accordance with a predefined algorithm. The prefetch module fetches a requested SA region and provides the requested SA region to a corresponding stage for the staged security processing of an associated portion of the packet.

19 Claims, 6 Drawing Sheets

300

400

SECURITY ASSOCIATION PREFETCH FOR SECURITY PROTCOL PROCESSING

CROSS-REFERENCE TO RELATED APPLICATIONS

The subject matter of this application is related to U.S. patent application Ser. Nos. 12/430,438 filed Apr. 27, 2009, 12/729,226 filed Mar. 22, 2010, 12/729,231 filed Mar. 22, 2010, 12/782,379 filed May 18, 2010, 12/782,393 filed May 18, 2010, 12/782,411 filed May 18, 2010, 12/854,315 filed Aug. 11, 2010, and 12/980,489 filed Dec. 29, 2010, the teachings of all of which are incorporated herein in their entireties by reference.

BACKGROUND OF THE INVENTION

1. Field of the Invention

The present invention relates to communication systems, in particular, to data packet security using security associations.

2. Description of the Related Art

Internet Protocol Security (IPsec) is a set of protocols for securing Internet Protocol (IP) communications by authenticating and encrypting IP packets in a data stream. IPsec includes protocols for establishing mutual authentication and negotiation of cryptographic keys, which might protect data flows between two or more host devices (e.g., computers or servers), between a pair of security gateways (e.g., routers or firewalls), or between a security gateway and a host device. The IPsec protocol is specified by the Internet Engineering Task Force (IETF) in a series of Requests for Comment (RFCs). Other network protocol standards, such as Secure Real-time Transport Protocol (SRTP), Transport Layer Security (TLS) and Secure Socket Layer (SSL) also define similar security services. Network protocol standards share information required for security processing through the use of security associations (SAs). For example, every packet entering security processing might have an associated SA which provides necessary information to encrypt or decrypt the packet. SAs contain important security information for two network entities during secured conversation. An SA might contain security attributes such as a crypto key, a hasher key, an initialization vector, and reuse context such as anti-replay information and RC4 states. The framework for establishing SAs is provided by the Internet Security Association and Key Management Protocol (ISAKMP). ISAKMP is officially specified by the IETF in RFC 2408.

In general, a packet's SA is sent as part of the packet's header. The packet's header might contain an SA index to identify the SA of the sending network entity. When security processing is performed on a received packet, the packet's corresponding SA is typically fetched from memory. Throughput might be limited during security processing on packets with large SAs where the security processing is done in stages. Throughput might also be limited during security processing by reuse context in the SA. For example, existing approaches to security processing using SA with reuse context might have to wait for a packet to complete processing before beginning the processing of a subsequent packet that uses the same reuse context in the SA.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Described embodiments provide a network processor that includes a security protocol processor for staged security processing of a packet having a security association (SA). An SA request module computes an address for the SA. The SA is fetched to a local memory. An SA prefetch control word (SPCW) is read from the SA in the local memory. The SPCW identifies one or more regions of the SA and the associated stages for the one or more regions. An SPCW parser generates one or more stage SPCWs (SSPCWs) from the SPCW. Each of the SSPCWs is stored in a corresponding SSPCW register. A prefetch module services each SSPCW register in accordance with a predefined algorithm. The prefetch module fetches a requested SA region and provides the requested SA region to a corresponding stage for the staged security processing of an associated portion of the packet.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION

In accordance with embodiments of the present invention, a security protocol processor provides staged security processing of a packet having a security association (SA). The security protocol processor architecture allows for dedicated SA prefetch channels for each stage of processing of a packet. An SA request module computes an address for the SA, and the SA is fetched to a local memory. An SA prefetch control word (SPCW) is read from the SA in the local memory. The SPCW identifies one or more regions of the SA and the associated stages for the one or more regions. An SPCW parser generates one or more stage SPCWs (SSPCWs) from the SPCW. Each of the SSPCWs is stored in a corresponding SSPCW register. A prefetch module services each SSPCW register in accordance with a predefined algorithm. The prefetch module fetches a requested SA region and provides the requested SA region to a corresponding stage for the staged security processing of an associated portion of the packet. This allows staged security processing of packet without having to advance the packet's entire SA at each stage.

Figure 1:
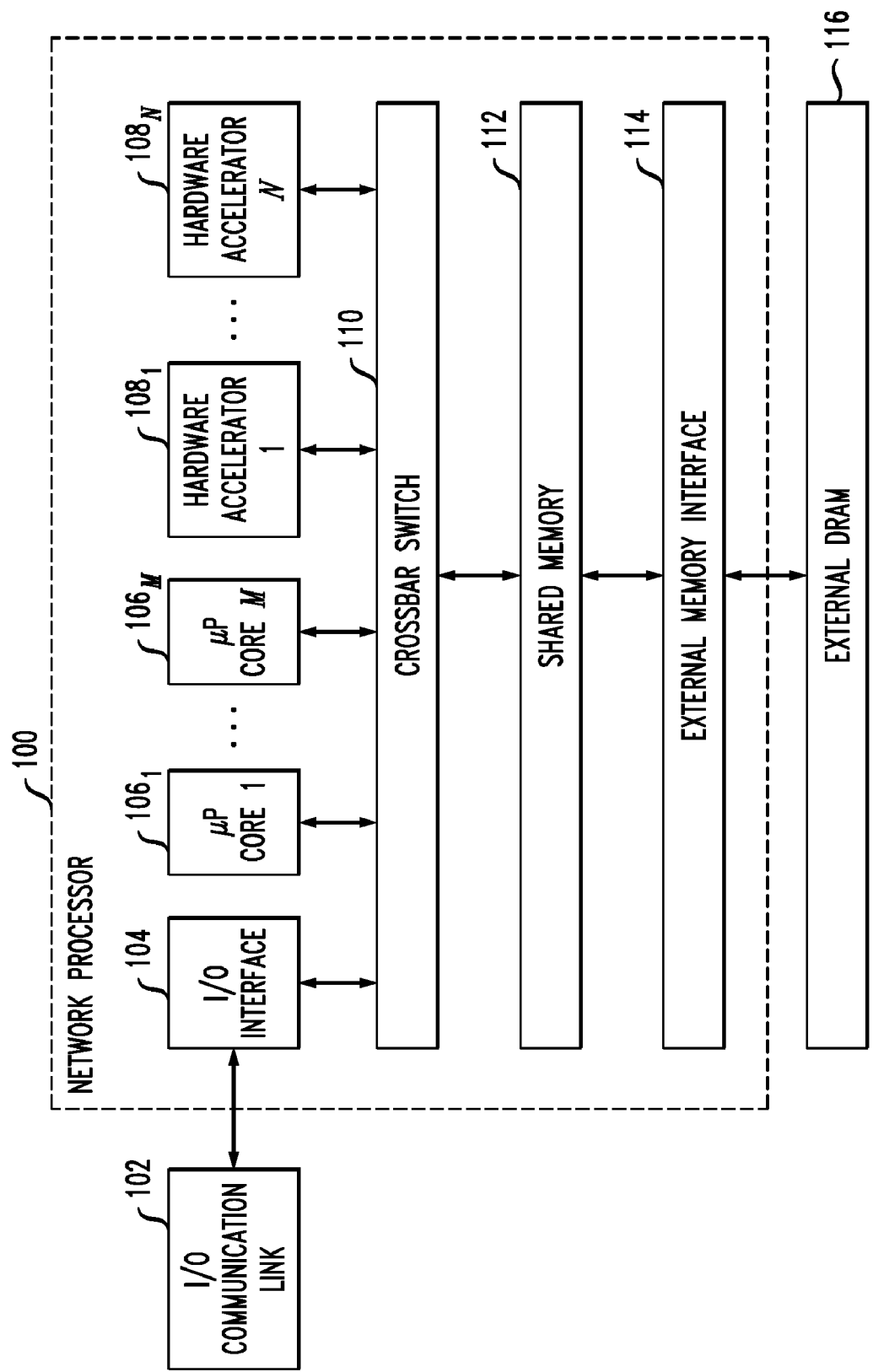
FIG. 1 shows a block diagram of a network processor operating in accordance with exemplary embodiments of the present invention.

FIG. 1 shows a block diagram of an exemplary single-chip network processor system (network processor 100) implemented as a system-on-chip (SoC). Network processor 100 might be used for processing data packets, performing protocol conversion, encrypting and decrypting data packets, or the like. As shown in FIG. 1, network processor 100 includes on-chip shared memory 112, one or more input-output (I/O) interfaces collectively shown as I/O interface 104, one or more microprocessor (µ) cores $106_1$-$106_M$, and one or more hardware accelerators $108_1$-$108_N$, where M and N are integers greater than or equal to 1. Network processor 100 also includes external memory interface 114 for communication with external memory 116. External memory 116 might typically be implemented as a dynamic random-access memory (DRAM), such as a double-data-rate three (DDR-3) DRAM, for off-chip storage of data. In some embodiments, such as shown in FIG. 1, each of the one or more I/O interfaces, µP cores and hardware accelerators might be coupled to a switch system 110 that is then coupled to shared memory 112. In embodiments of the present invention, one or more of the various µp cores 106 and hardware accelerators 108 might be employed as a security protocol processor (e.g. (SPP) 200 described subsequently with respect to FIG. 2) implementing one or more security protocols, such as IPsec.

I/O interface 104 might typically be implemented in hardware connecting network processor 100 to one or more external devices through I/O communication link 102. I/O communication link 102 might generally be employed for communication with one or more external devices, such as a computer system or a networking device, interfacing with network processor 100. I/O communication link 102 might be a custom-designed communication link, or might conform to a standard communication protocol such as, for example, a Small Computer System Interface ("SCSI") protocol bus, a Serial Attached SCSI ("SAS") protocol bus, a Serial Advanced Technology Attachment ("SATA") protocol bus, a Universal Serial Bus ("USB"), an Ethernet link, an IEEE 802.11 link, an IEEE 802.15 link, an IEEE 802.16 link, a Peripheral Component Interconnect Express ("PCI-E") link, a Serial Rapid I/O ("SRIO") link, or any other interface link. Received packets are preferably placed in a buffer in shared memory 112.

In embodiments of the present invention, shared memory 112 is a conventional memory operating as a cache and might be allocated or subdivided. For example, shared memory 112 might include one or more First-in First-out (FIFO) queues that might be dynamically allocated to the various µP cores 106 and hardware accelerators 108. External memory interface 114 couples shared memory 112 to external DRAM 116 to provide off-chip storage of data not needed by the various µP cores 106 and hardware accelerators 108 to free space in shared memory 112. The µP cores and hardware accelerators might interact with each other as described in related U.S. patent application Ser. Nos. 12/782,379, 12/782,393, and 12/782,411, all filed May 18, 2010, the teachings of all of which are incorporated herein in their entireties by reference. Switch 110, as shown in the FIG., might be a non-blocking crossbar switch such as described in related U.S. patent application Ser. Nos. 12/430,438 filed Apr. 27, 2009, 12/729,226 filed Mar. 22, 2010, and 12/729,231 filed Mar. 22, 2010, the teachings of all of which are incorporated herein in their entireties by reference.

As shown in FIG. 1, one or more data packets are transmitted from a transmitting device (not shown) to network processor 100, via communication link 102. Network processor 100 might receive data packets from one or more active data streams concurrently. As described herein, where communication link 102 is coupled to a packet switched network, transmitted data packets might arrive at network processor 100 in an order different from the transmission order since, for example, each data packet might be routed over a different path through the network, or various nodes in the network might delay one or more packets for quality-of-service (QoS) requirements. Thus, the transmitter appends a sequence number to each data packet indicating the order in which the packet was sent.

Figure 2:
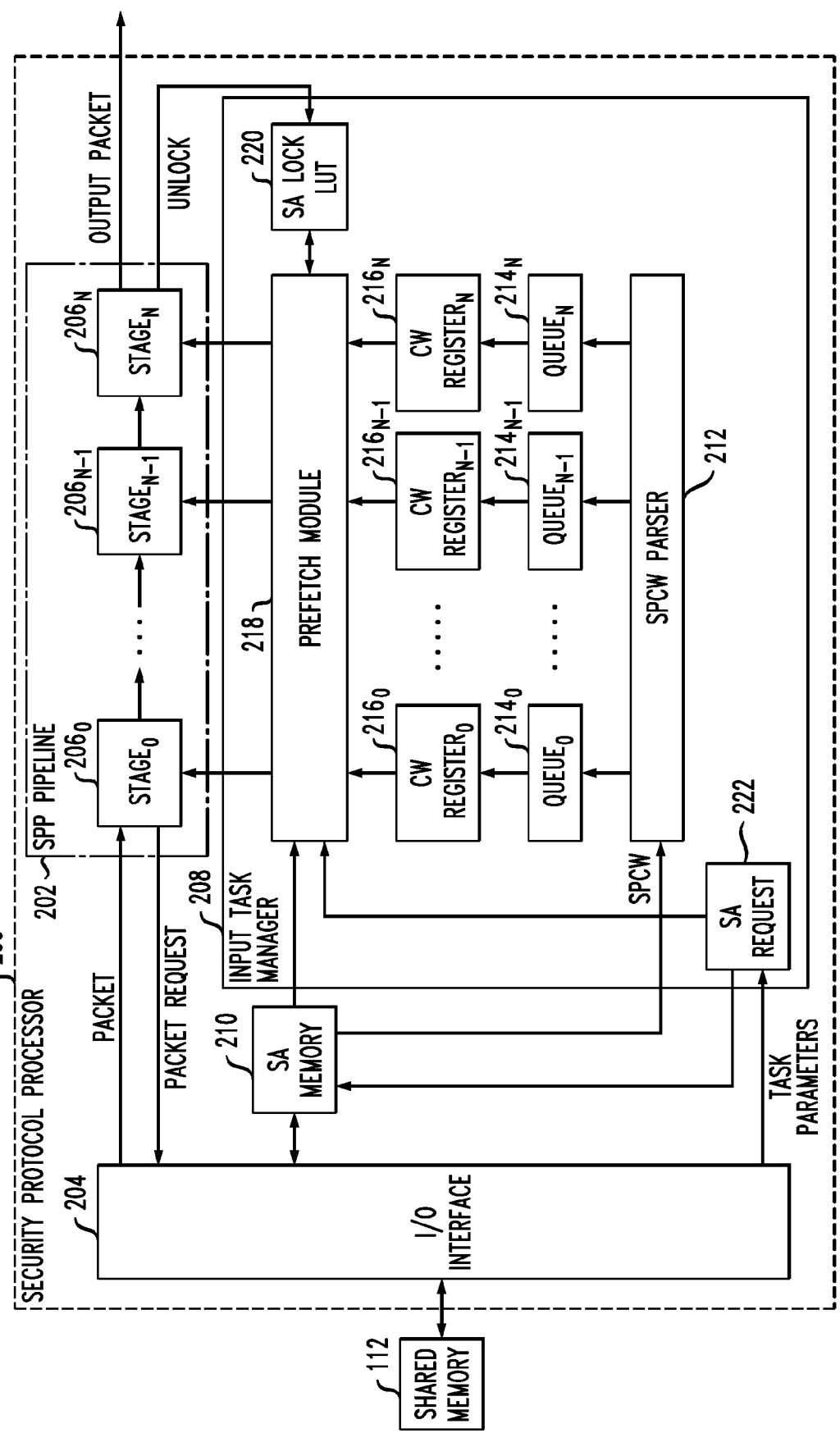
FIG. 2 shows a block diagram of an exemplary Security Protocol Processor (SPP) employed by the network processor of FIG. 1.

FIG. 2 shows a block diagram of security protocol processor (SPP) 200 employed by network processor 100 in accordance with embodiments of the present invention. In some embodiments, SPP 200 is implemented as a programmable, multi-protocol, security hardware accelerator associated with, for example, one of hardware accelerators 108. SPP 200 might be compatible with a variety of security protocols, such as IPsec, 3GPP Network Access Security, SRTP and TRS/SSL. SPP 200 provides encryption/decryption capabilities and anti-replay processing. In embodiments of the present invention, SPP 200 receives data packets from shared memory 112. I/O Interface 204 might be employed as an interface block to communicate with network processor 100. A received packet might contain, for example, a pointer to a corresponding security association (SA). For example, each packet entering SPP 200 might have an associated SA which provides necessary information to encrypt or decrypt each packet. The SA, also referred to as a "security context," is a construct that associates security services with the active data packet to be protected. The SA might be stored in a portion of shared memory 112 dedicated to storing security parameters, or the SA might be stored in a separate security memory dedicated only to storing security parameters and accessible only by those ones of µP cores 106 and hardware accelerators 108 that perform security processing. The SA may include, among other information, anti-replay information and cypher and hash keys. In some embodiments SAs are temporarily stored in SA memory 210 which is local to SPP 200. In some embodiments SA memory 210 is a level 1 (L1) cache.

As shown in FIG. 2, SPP 200 might include I/O Interface 204 and Input Task Manager (ITM) 208. Embodiments perform security processing in one or more stages $206_0$-$206_N$, represented in SPP pipeline 202. FIG. 2 shows SPP pipeline 202 with N+1 number of stages 206. Each stage $206_0$-$206_N$ of SPP pipeline 202 might represent one of N+1 processors, in which each processor computes desired parameters for a packet based on the packet's SA. For example, an input packet from I/O Interface 204 might undergo a first round of security processing at $stage_0$ $206_0$, and then proceed through each of the subsequent stages $206_1$-$206_N$ in chronological order until the processed packet is output from SPP 200 after its last round of security processing at $stage_N$ $206_N$.

Figure 3:
FIG. 3 shows an exemplary structure of a security association (SA) Prefetch Control Word (SPCW) in accordance with embodiments of the present invention.

Embodiments of the present invention employ ITM 208 to provide independent SA prefetch channels for each stage $206_0$-$206_N$. For example, SA memory 210 might store an SA Prefetch Control Word (SPCW) for every SA. FIG. 3 illustrates exemplary SPCW structure 300 of a security system (e.g., SPP 200) which has N+1 pipeline stages 206. In accordance with embodiments of the present invention, an SA data block is partitioned into multiple regions. SPCW structure 300 reflects an SPCW that is segmented into multiple fields. One or more regions of an SA might be assigned to one pipeline stage 206. The SPCW might be defined, for example, and stored in the first word of every SA. The SPCW might have fields that specify the length of each region of the SA data block. The SPCW might be comprised of fields that specify the destination (e.g., one of stages $206_0$-$206_N$) of each region of the SA. For example, FIG. 3 shows SPCW structure 300 in which field Region 0 Length might specify the length of SA data destined for $stage_0$ $206_0$. Field Region 1 Length might specify the length of the SA data destined for one of stages $206_0$-$206_N$ specified by field Dest 1. Field Region N Length might specify the length of the SA data destined for one of stages $206_0$-$206_N$ specified by field Dest N. In this example, fields Dest 1 and Dest N specify the stage 206 where the data of SA Region 1 and SA Region N, respectively, is sent in SPP pipeline 202. The data in Region 0 of an SA data block is directly fetched into a register file of $stage_0$ $206_0$. In some embodiments of SPCW structure 300, when a field Dest has a value of zero, the SA data in the region corresponding to Dest is broadcast to all stages 206 (e.g. stages $206_1$-$206_N$) except for $stage_0$ $206_0$.

Figure 4:
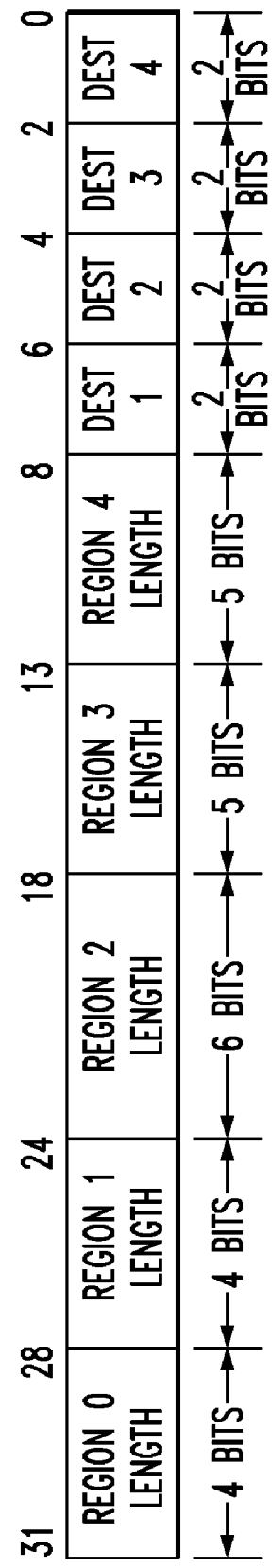
FIG. 4 shows an exemplary structure of a SA Prefetch Control Word (SPCW) employed by the SPP of FIG. 2.

FIG. 4 shows an exemplary SPCW structure 400 in accordance with embodiments of the present invention. SPCW structure 400 might be used for security processing at SPP 200 with four processors (e.g., the four stages $206_0$-$206_3$) in SPP pipeline 202. SPCW structure 400 is 32-bits. The Region Length fields might vary in size because redundant bits are removed in SPCW structure 400. For example, field Region 0 Length might hold an SA identifier (e.g., SA index value) and security parameters for $stage_0$ $206_0$. Field Region 1 Length might be responsible for a cyphering stage in crypto processing, and might be read by $stage_1$ $206_1$ or $stage_2$ $206_2$. Field Region 2 Length might store RC4/IV chaining information. Field Region 3 Length might be responsible for a hashing stage in crypto processing, and might be read by $stage_1$ $206_1$ or $stage_2$ $206_2$. In some embodiments, field Region 4 Length is ready exclusively by the final stage 206 in SPP pipeline 202. SPCW structure 400 shows four Dest fields, each Dest field having a length of 2 bits. Field Dest might be encoded with bits '00' to broadcast the associated SA data to all stages 206 except $stage_0$ $206_0$. Field Dest might be encoded with bits '01' in order to send the associated data to $stage_1$ $206_1$. Field Dest encodings '10' and '11' might send associated SA data to $stage_2$ $206_2$ and $stage_3$ $206_3$, respectively. A stage SPCW (SSPCW), discussed further herein, might be comprised of a start address and a length of an SA region corresponding to a particular stage 206. For example, a region's start address might be computed as a previous region's start address plus the previous region's length.

FIG. 2 shows an exemplary SPP 200 for security processing using SPCWs, such as an SPCW with SPCW structure 300. Task parameters are read by SA request module 222 via I/O interface 204. One or more of hardware accelerators 108 might generate task parameters. Task parameters might include security processing information such as SA index number, packet length, and header length. SA request module 222 extracts the SA index number from the task parameters. The SA index might include several fields, and SA request module 222 uses the fields of the SA index to determine a physical address of the SA located in shared memory 112. When SA memory 210 receives an SA address from SA request module 222, SA memory fetches the SA, for example, from shared memory 112.

SPCW parser 212 generates a stage SPCW (SSPCW) for each stage $206_0$-$206_N$, and then SPCW parser 212 pushes the SSPCWs into queues $214_0$-$214_N$, wherein each stage $206_0$-$206_N$ has a corresponding SSPCW queue $214_0$-$214_N$. Each SSPCW is associated with a stage 206. Each SSPCW specifies the start address of desired SA data for the corresponding stage 206, and specifies the length of desired SA data for the corresponding stage 206. Prefetch module 218 might use the information in an SSPCW to determine the address of SA data that should be fetched for processing at an associated stage 206. Prefetch module 218 might also use the information in an SSPCW to determine how many bits of SA data should be fetched for processing at an associated stage 206. In some embodiments, each SSPCW queue $214_0$-$214_N$ is coupled to a corresponding CW register $216_0$-$216_N$. CW registers 216 might send requests to prefetch module 218. In embodiments of the present invention, prefetch module 218 functions as an arbiter working in a round-robin or weighted round-robin fashion, although other queue service methods known in the art might be employed. Thus, prefetch module 218 might take turns granting the requests from CW registers 216 in a predefined manner or algorithm. When prefetch module 218 grants a request from one of CW registers $216_0$-$216_N$, prefetch module 218 fetches SA data corresponding to the requested SSPCW from SA memory 210, and the SA data is sent to the respective stage 206 for security processing. Prefetch module 218 might also fetch additional task parameters for staged security processing from a task parameter buffer in SA request module 222. After a request is granted by prefetch module 218, one of CW registers $216_0$-$216_N$ from which the request was granted might pull in a new SSPCW from the corresponding SSPCW queue $214_0$-$214_N$.

In some embodiments of the present invention, ITM 208 employs SA lock look-up-table (LUT) 220, for example, to check the lock status of a region. Before prefetch module 218 grants a request and fetches SA data according to an SSPCW, it might need to check the lock status of the SSPCW's corresponding region. To check the lock status, prefetch module 218 retrieves the status from SA lock LUT 220. If the SA region to be fetched is locked, prefetch module 218 might skip the request and try the next request from subsequent CW register 216.

Figure 5:
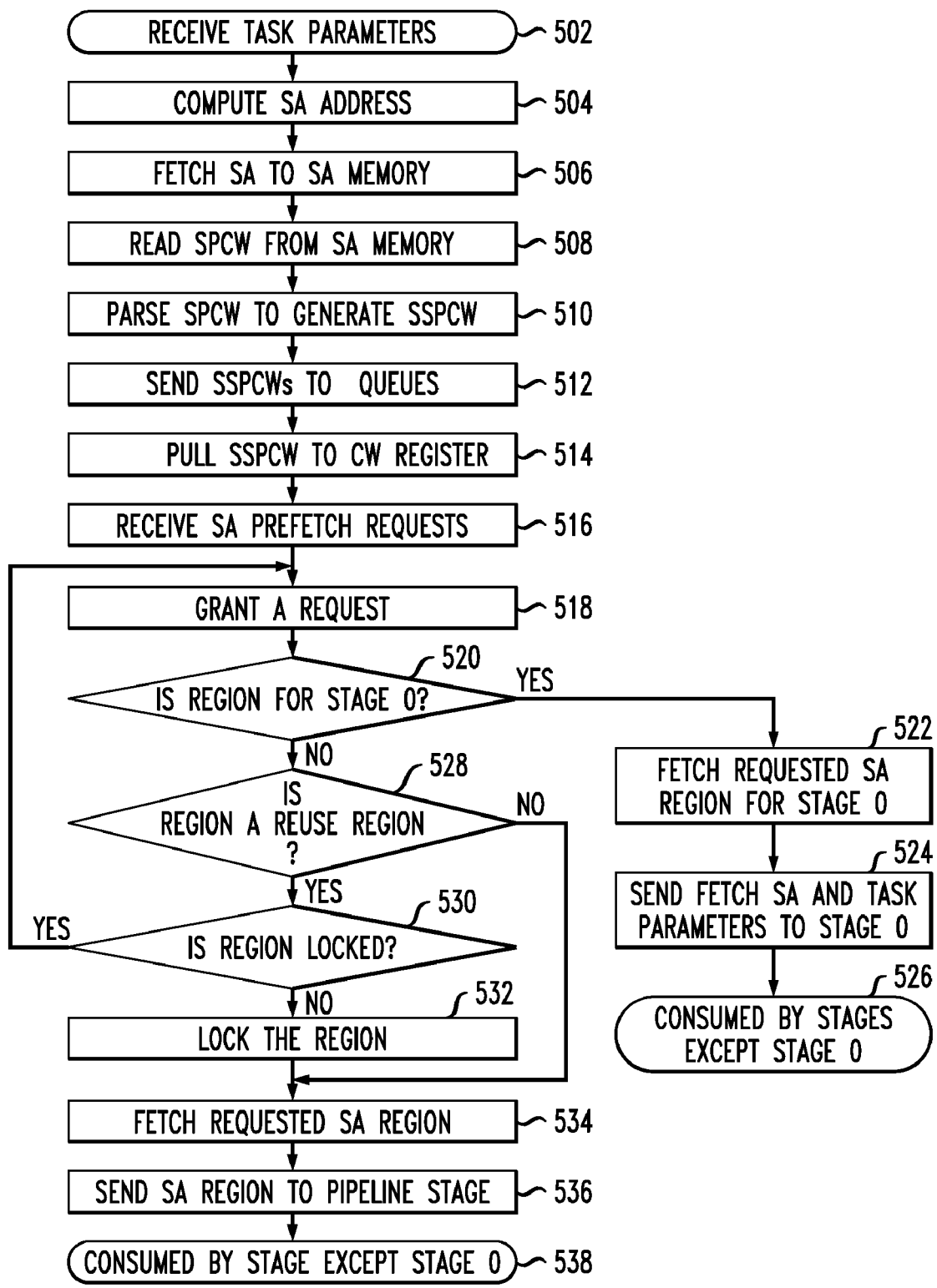
FIG. 5 shows a flow diagram of a process for security association prefetching in accordance with embodiments of the present invention.

FIG. 5 shows a flow diagram of SA prefetch process 500 in accordance with embodiments of the present invention. At step 502, input task parameters are received by SA request module 222 employed by ITM 208. The input task parameters might include information such as the SA index and the input packet length. For example, the SA index might identify which SA is associated with the current packet. At step 504, SA request module 222 computes the SA address based on the SA index. For example, SA request module 222 might employ an SA index table to determine an SA address from the SA index. At step 506, SA request module 222 issues an instruction to fetch the SA to SA memory 210. For example, the packet's corresponding SA might be retrieved from shared memory 112 to be stored in SA memory 210. At step 508, ITM 208 reads the SPCW from SA memory 210. In preferred embodiments the SPCW is the first word of the SA. At step 510, SPCW parser 212 parses the SPCW to generate SSPCWs for respective pipeline stages $206_0$-$206_N$. The SSPCWs are sent to their corresponding SSPCW queues $214_0$-$214_N$ at step 512. At step 514, CW registers $216_0$-$216_N$ pulls one SSPCW from their corresponding SSPCW queues $214_0$-$214_N$. In preferred embodiments CW register 216 is idle before it pulls its respective SSPCW. At step 516, prefetch module 218 receives SA prefetch requests from CW registers $216_0$-$206_N$. In the embodiment illustrated in FIG. 2, prefetch module 218 might function as an arbiter that grants requests in a round-robin pattern. Prefetch module 218 grants a request at step 518.

A test at step 520 determines whether the SA region corresponding to the granted request is destined for processing at $stage_0$ $206_0$. If the test at step 520 determines that the requested region is for $stage_0$ $206_0$, prefetch module 218 fetches the requested SA region for $stage_0$ $206_0$ at step 522. At step 524, prefetch module 218 sends the fetched SA region and task parameters in the task parameter buffer of SA request module 222 to stage$_0$ 206$_0$. At step 526, stage$_0$ 206$_0$ initiates packet processing with the associated SA region.

If the test at step 520 determines that the requested region is not for processing at stage$_0$ 206$_0$, processing continues to step 528. At step 528, a test determines whether the requested SA region corresponding to the granted request is a reuse region. A reuse region (or reuse context) refers to fields of the SA which might need to be updated. Reuse regions include fields of the SA such as sequence numbers and anti-replay windows. For example, when SPP 200 finishes processing a packet in a data stream, the sequence number and the anti-replay number might need to be updated in the data stream's SA. If the test at step 528 determines that the SA region corresponding to the granted request is not a reuse region, processing continues to step 534, where prefetch module 218 fetches the requested SA region. At step 536, prefetch module 218 sends the requested SA region to SPP pipeline 202. At step 538, the requested SA region is consumed by its corresponding stage 206 of SPP pipeline 202 in order to perform security processing on the packet.

If the test at step 528 determines that the SA region corresponding to the granted request is a reuse region, processing continues to step 530. A test at step 530 determines whether the SA region corresponding to the request is locked. For example, an arbiter (e.g., prefetch module 218) might check the lock status of the requested SA region by looking at the indication provided by SA lock LUT 220. If SA lock LUT 220 provides a "locked" indication, processing continues to step 518, where prefetch module 218 grants a request (e.g., the subsequent request in the round-robin pattern). If the test at step 530 determines that the requested SA region is unlocked, processing continues to step 532. At step 532, the SA region corresponding to the granted request is locked. For example, prefetch module 218 might provide a lock signal to SA lock LUT 220. At step 534, prefetch module 218 fetches the requested SA region, for example, from SA memory 210. At step 536, prefetch module 218 sends the requested SA region to the pipeline stage 206 corresponding to the SSPCW of the granted request. At step 538, the requested SA region is consumed by its corresponding stage 206 of SPP pipeline 202 in order to perform security processing. For example, stages 206$_1$-206$_N$ use their respective SA regions to perform security processing on a packet and generate an output at each of the stages 206$_1$-206$_N$.

Figure 8:
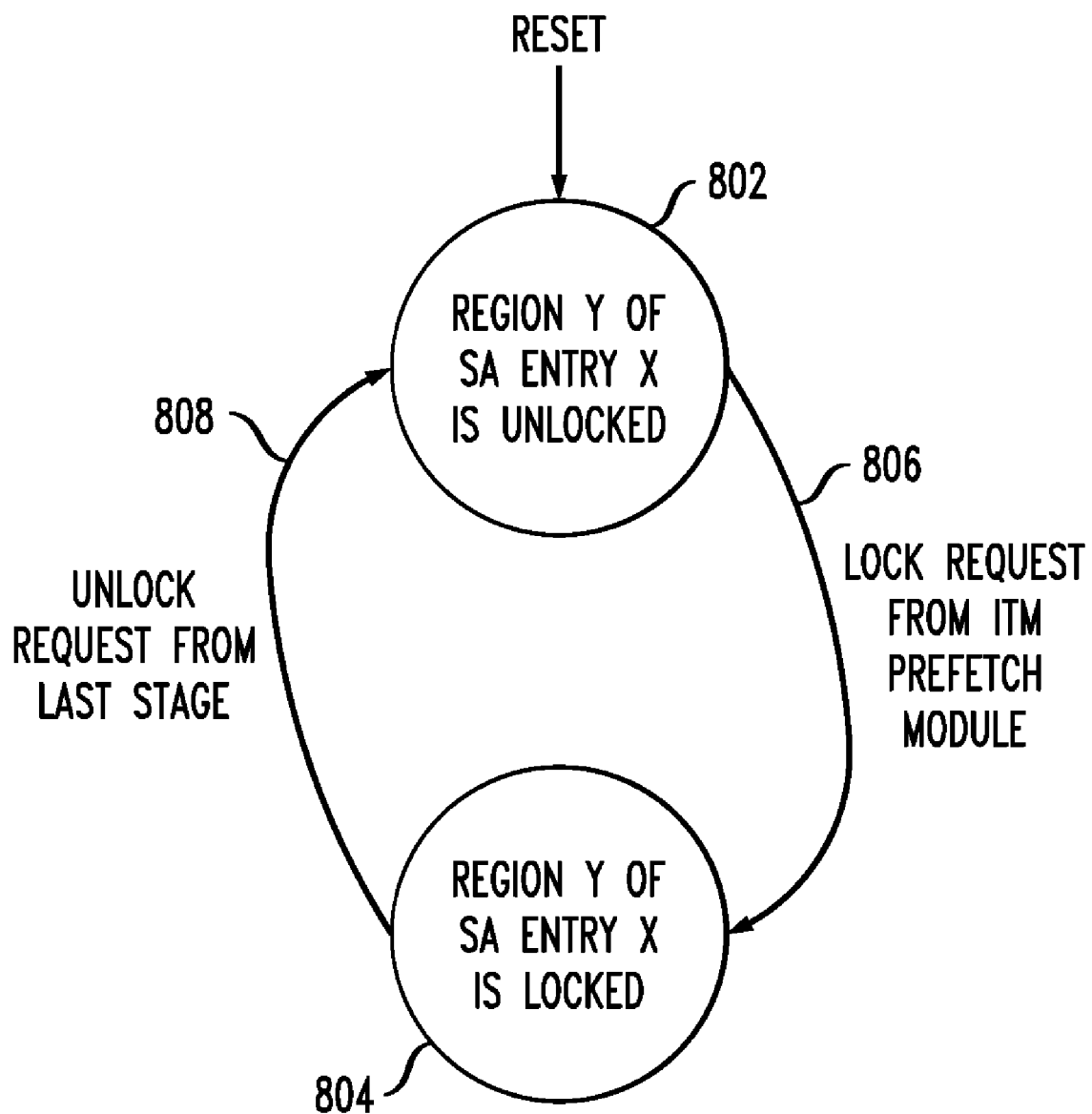
FIG. 8 shows a state transition diagram for an SA lock look-up-table (LUT) in accordance with embodiments of the present invention.

If a packet has been processed by the last stage 206, a reuse field of the SA associated with the packet might need to be updated by SA lock LUT 220. Exemplary embodiments define SA lock LUT 220 as having M entries, where M is defined or otherwise related to the number of SAs that might be used concurrently or simultaneously in SPP 200. Each of the M entries might contain L bits, where L is determined by the number of pipeline stages 206 that consume SA regions that are reused. FIG. 8 shows state transition diagram 800 for SA lock LUT 220 in accordance with embodiments of the present invention. For example, suppose SA lock LUT 220 is initialized to 0 (e.g., each bit in each entry set to logic '0') at the beginning of processing so that all reuse regions of the corresponding SA are in an unlock state. Initialization might be accomplished through a reset signal as shown in FIG. 8. For example, as shown in FIG. 8, reset signal puts region Y of SA entry X in unlock state 802. If a packet that is associated with SAX enters SPP 200, one of CW registers 216$_0$-216$_N$ might send a prefetch request for SA region Y to prefetch module 218. If the prefetch request is granted by prefetch module 218, lock request 806 is issued to SA lock LUT 220 from prefetch module 218. Lock request 806 puts region Y of SA entry X in lock state 804, for example, by setting the bit corresponding to region Y of SAX to logic '1'. Subsequent packets are not able to fetch and use region Y of SAX while it is in lock state 804. If a subsequent packet using SAX is input into SPP pipeline 202 and a request for processing with region Y is received by prefetch module 218, the request will not be granted because SA lock LUT 220 provides an indication to prefetch module 218 that the previous packet has not finished using SA region Y. When the packet is processed at its last stage 206, unlock request 808 for region Y of SA entry X is issued to SA lock LUT 220 from stage 206$_N$ (unlock request 808 is shown as signal Unlock in FIG. 2). Unlock request 808 puts region Y of SA entry X in unlock state 802, for example, by setting the bit corresponding to region Y of SAX to logic '0'. Subsequent packets are able to fetch and use region Y of SAX while it is in unlock state 802.

Figure 6:
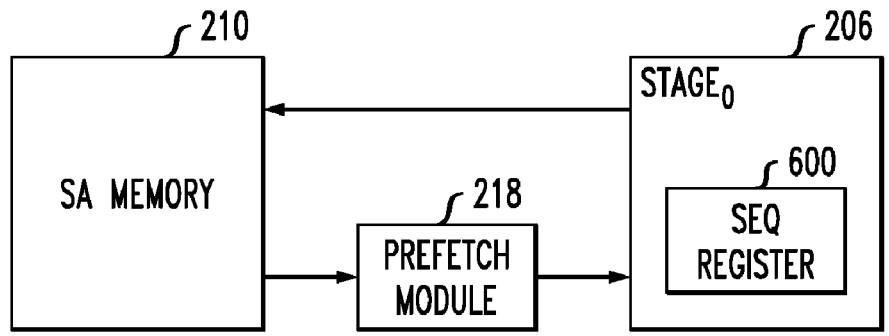
FIG. 6 shows an exemplary sequence register of the SPP of FIG. 2.
Figure 7:
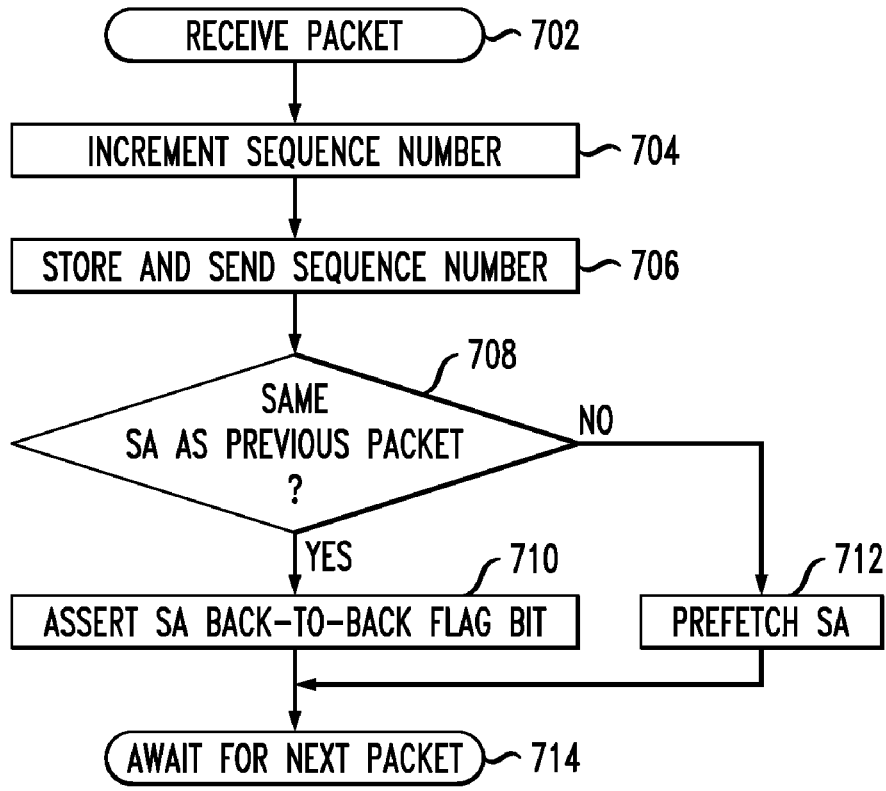
FIG. 7 shows a flow diagram of a process for using the SA back-to-back flag bit in accordance with embodiments of the present invention.

FIG. 6 shows that a SA sequence number register 600 might be used with SA back-to-back flag bit process 700, shown in FIG. 7, in accordance with embodiments of the present invention. The SA back-to-back flag bit process 700 might be implemented when two consecutive requests from CW registers 216 refer to the same SA, and when the sequence number is updated at stage$_0$ 206$_0$. At step 702, a first packet is received at stage$_0$ 206$_0$. At step 704, the sequence number is incremented at the first stage of SPP pipeline 202 (e.g., stage$_0$ 206$_0$). At step 706, stage$_0$ 206$_0$ stores the updated sequence number in register 600 and sends it to SA memory 210. A test at step 708 determines if a subsequent packet is using the same SA as the previous packet. If the subsequent packet received by stage$_0$ 206$_0$ is using the same SA as the previous packet, processing continues to step 710. At step 710, prefetch module 218 will assert the SA back-to-back flag bit, and will not prefetch the SA for stage$_0$ 206$_0$. Prefetch module 218 asserts the SA back-to-back bit by passing the bit to register 600. This bit provides an indication to stage$_0$ 206$_0$ that the same SA information that was used to process the previous packet is used to process the subsequent packet, and the subsequent packet is processed using the sequence number stored in register 600. After the subsequent packet is processed, the process continues to step 714, where process 700 is idle until the next packet is received. If the test at step 708 determines that the subsequent packet has a different SA from the previous packet, the subsequent packet's SA is prefetched at step 712. At step 712, prefetch module 218 prefetches the SA for stage$_0$ 206$_0$.

A security protocol processor adapted to fetch security associations in accordance with exemplary embodiments of the present invention provides for the following advantages. The security protocol processor architecture allows for dedicated security association prefetch channels for each stage of processing. The security protocol processor architecture allows for staged security processing without having to advance the entire security association at each stage. Also, the security processor architecture can begin processing a packet with the same security association as a previous packet, even if the previous packet processing is not complete.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

While the exemplary embodiments of the present invention have been described with respect to processing in hardware, including possible implementation as a single integrated circuit, a multi-chip module, a single card, or a multi-card circuit pack, the present invention is not so limited. As would be apparent to one skilled in the art, various functions of hardware may also be implemented in a software program. Such software may be implemented as, for example, a digital signal processor, micro-controller, or general purpose computer.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the invention. The present invention can also be embodied in the form of program code, for example, whether stored in a non-transitory machine-readable storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. Signals and corresponding nodes or ports may be referred to by the same name and are interchangeable for purposes here. It will be further understood that various changes in the details, materials, and arrangements of the parts which have been described and illustrated in order to explain the nature of this invention may be made by those skilled in the art without departing from the scope of the invention as expressed in the following claims.

We claim:

1. A method of processing a packet of data for either encryption or decryption having a security association (SA) for staged security processing on a network processor, the method comprising:
   computing an address for the SA based on one or more task parameters, wherein the SA is comprised of one or more regions;
   fetching the SA corresponding to the task parameters to a local memory;
   reading an SA prefetch control word (SPCW) from the SA in the local memory, wherein the SPCW identifies the one or more regions and associated stages for the one or more regions;
   generating one or more stage SPCWs (SSPCWs) from the SPCW;
   storing each of the SSPCWs in a corresponding SSPCW register;
   servicing each SSPCW register in accordance with a predefined algorithm, wherein servicing includes:
      fetching a requested SA region from the local memory, wherein the requested SA region corresponds to a selected SSPCW; and
      providing the requested SA region to a corresponding stage for the staged security processing of an associated portion of the packet.

2. The method as recited in claim 1, wherein the predefined algorithm is a round-robin algorithm.

3. The method as recited in claim 1, wherein the SPCW is comprised of:
   one or more destination fields; and
   one or more region fields, each region field associated with one of the one or more destination fields, wherein each destination field identifies one or more stages for the associated region field, and wherein each associated region field corresponds to one or more of the regions of the SA.

4. The method as recited in claim 1, further comprising:
   determining whether the requested SA region is a reuse region; and
   if the requested SA region is a reuse region, checking an SA look-up-table (LUT) to determine whether the requested SA region is locked or unlocked.

5. The method as recited in claim 4, further comprising:
   if the requested SA region is unlocked, locking the requested SA region in the SA LUT, thereby preventing a subsequent packet from using the requested SA region.

6. The method as recited in claim 1, further comprising:
   after a last stage of the staged security processing, unlocking the requested SA region of an SA look-up table (LUT), thereby allowing a subsequent packet to use the requested SA region.

7. The method as recited in claim 1, further comprising:
   incrementing a sequence number associated with the packet at a first stage;
   storing the sequence number in a register of the first stage;
   receiving a subsequent packet having a subsequent SA;
   determining that the subsequent SA is equivalent to the SA;
   passing a back-to-back bit to the register of the first stage, thereby providing an indication to the first stage that the subsequent SA is equivalent to the SA; and
   processing, by the first stage, the subsequent packet with the incremented sequence number and the SA.

8. The method of claim 1, wherein the method is implemented as steps executed by a hardware accelerator of a network processor.

9. The method of claim 1, wherein the method is implemented as steps executed by a system-on-chip (SoC) network processor.

10. A network processing device coupled to a packet-switched network, comprising:
a security processing device comprising one or more stages adapted to perform staged security processing on a packet of data;
an SA request module adapted to compute an address for a security association (SA) based on one or more task parameters, wherein the SA is comprised of one or more regions;
a local memory adapted to store the SA corresponding to the task parameters;
an SA parser adapted to read an SA prefetch control word (SPCW) from the SA in the local memory, wherein the SPCW identifies the one or more regions and associated stages for the one or more regions, and wherein the SA parser is further adapted to generate one or more stage SPCWs (SSPCWs) from the SPCW;
one or more SSPCW registers adapted to storing each of the corresponding SSPCWs; and
a prefetch module adapted to service each SSPCW register in accordance with a predefined algorithm,
wherein the prefetch module is further adapted to:
fetch a requested SA region from the local memory, wherein the requested SA region corresponds to a selected SSPCW; and
provide the requested SA region to a corresponding stage for the staged security processing of an associated portion of the packet.

11. The network processor of claim 10, further comprising:
an SA look-up-table (LUT) adapted to indicate a lock status to the prefetch module, wherein the prefetch module is further adapted to:
determine whether the requested SA region is a reuse region; and
if the requested SA region is a reuse region, check the lock status of the SA LUT to determine whether the requested SA region is locked or unlocked.

12. The network processor of claim 11, wherein the prefetch module is further adapted to:
if the requested SA region is unlocked, lock the requested SA region in the SA LUT, thereby preventing a subsequent packet from using the requested SA region.

13. The network processor of claim 10, wherein the SPCW comprises:
one or more destination fields; and
one or more region fields, each region field associated with one of the one or more destination fields, wherein each destination field identifies one or more stages for the associated region field, and wherein each associated region field corresponds to one or more of the regions of the SA.

14. A machine-readable, non-transitory storage medium, having encoded thereon program code, wherein, when the program code is executed by a machine, the machine implements a method of processing a packet of data for either encryption or decryption having a security association (SA) for staged security processing on a network processor, the method comprising:
computing an address for the SA based on one or more task parameters, wherein the SA is comprised of one or more regions;
fetching the SA corresponding to the task parameters to a local memory;
reading an SA prefetch control word (SPCW) from the SA in the local memory, wherein the SPCW identifies the one or more regions and associated stages for the one or more regions;
generating one or more stage SPCWs (SSPCWs) from the SPCW;
storing each of the SSPCWs in a corresponding SSPCW register;
servicing each SSPCW register in accordance with a predefined algorithm, wherein servicing includes:
fetching a requested SA region from the local memory, wherein the requested SA region corresponds to a selected SSPCW; and
providing the requested SA region to a corresponding stage for the staged security processing of an associated portion of the packet.

15. The storage medium as recited in claim 14, wherein the SPCW is comprised of:
one or more destination fields; and
one or more region fields, each region field associated with one of the one or more destination fields, wherein each destination field identifies one or more stages for the associated region field, and wherein each associated region field corresponds to one or more of the regions of the SA.

16. The storage medium as recited in claim 14, further comprising:
determining whether the requested SA region is a reuse region; and
if the requested SA region is a reuse region, checking an SA look-up-table (LUT) to determine whether the requested SA region is locked or unlocked.

17. The storage medium as recited in claim 16, further comprising:
if the requested SA region is unlocked, locking the requested SA region in the SA LUT, thereby preventing a subsequent packet from using the requested SA region.

18. The storage medium as recited in claim 14, further comprising:
after a last stage of the staged security processing, unlocking the requested SA region of an SA look-up table (LUT), thereby allowing a subsequent packet to use the requested SA region.

19. The storage medium as recited in claim 14, further comprising:
incrementing a sequence number associated with the packet at a first stage;
storing the sequence number in a register of the first stage;
receiving a subsequent packet having a subsequent SA;
determining that the subsequent SA is equivalent to the SA;
passing a back-to-back bit to the register of the first stage, thereby providing an indication to the first stage that the subsequent SA is equivalent to the SA; and
processing, by the first stage, the subsequent packet with the incremented sequence number and the SA.

* * * * *